United States Patent
Saunders et al.

(10) Patent No.: US 7,636,561 B2
(45) Date of Patent: Dec. 22, 2009

(54) DIVERSITY SWITCH COMBINER

(75) Inventors: Simon R. Saunders, West Sussex (GB); Stephen Michael Leach, West Sussex (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 664 days.

(21) Appl. No.: 10/984,894

(22) Filed: Nov. 10, 2004

(65) Prior Publication Data

US 2006/0009176 A1    Jan. 12, 2006

(30) Foreign Application Priority Data

Nov. 18, 2003    (EP)    ................... 03257283

(51) Int. Cl.
*H04B 1/06*    (2006.01)
(52) U.S. Cl. ................. 455/277.2; 455/137; 455/154.1; 375/347
(58) Field of Classification Search ................. 455/272, 455/275, 276.1, 277.1, 277.2, 246, 334, 562, 455/101–103, 133–137, 150.1, 154.1, 278.1; 342/359, 383, 372–375; 375/132, 136, 347
See application file for complete search history.

(56) References Cited

U.S. PATENT DOCUMENTS

| | | | |
|---|---|---|---|
| 6,009,307 A | 12/1999 | Granata et al. | |
| 6,067,449 A | 5/2000 | Jager | |
| 6,263,195 B1* | 7/2001 | Niu et al. | ................. 455/150.1 |
| 6,314,127 B1* | 11/2001 | Lynch et al. | ................. 375/144 |
| 6,574,460 B1* | 6/2003 | Lindenmeier et al. | ..... 455/277.1 |
| 6,728,517 B2* | 4/2004 | Sugar et al. | ................... 455/73 |
| 6,738,439 B1* | 5/2004 | Okanoue et al. | ............ 375/347 |
| 6,922,549 B2 | 7/2005 | Lyons et al. | |
| 7,065,146 B1 | 6/2006 | Lou et al. | |
| 7,072,628 B2 | 7/2006 | Agashe et al. | |
| 7,142,824 B2* | 11/2006 | Kojima et al. | ................. 455/78 |
| 2002/0004375 A1* | 1/2002 | Spencer et al. | ........... 455/277.1 |
| 2002/0122499 A1 | 9/2002 | Kannan et al. | |
| 2002/0151301 A1* | 10/2002 | Miyoshi | ..................... 455/423 |
| 2002/0186797 A1 | 12/2002 | Robinson | |
| 2003/0002471 A1 | 1/2003 | Crawford et al. | |
| 2003/0090993 A1 | 5/2003 | Sato | |
| 2003/0125078 A1* | 7/2003 | Hong | ........................ 455/556 |
| 2004/0198420 A1* | 10/2004 | He et al. | ................. 455/552.1 |
| 2004/0198452 A1* | 10/2004 | Roy | ........................ 455/562.1 |
| 2004/0219959 A1* | 11/2004 | Khayrallah et al. | ...... 455/575.7 |
| 2004/0266375 A1 | 12/2004 | Li et al. | |
| 2005/0107048 A1* | 5/2005 | Saunders et al. | ............ 455/101 |
| 2006/0009176 A1 | 1/2006 | Saunders et al. | |
| 2006/0014497 A1* | 1/2006 | Doi et al. | ................. 455/67.11 |

FOREIGN PATENT DOCUMENTS

| | | |
|---|---|---|
| EP | 1 294 154 A2 | 3/2003 |
| EP | 1 296 466 A2 | 3/2003 |
| FR | 2 833 435 | 7/2003 |
| WO | WO 03/073682 A1 | 9/2003 |

* cited by examiner

*Primary Examiner*—Nhan T Le
(74) *Attorney, Agent, or Firm*—Birch, Stewart, Kolasch & Birch, LLP

(57) ABSTRACT

A diversity switch combiner for use in systems for receiving wideband signals is arranged to split the received signal into separate channels each carrying a respective frequency band. Respective switch means are provided for each channel in order to switch the input of each channel between different antennas. A switch control determines the switch setting in accordance with the result of a comparison operation, preferably performed during a guard period, in which the signal qualities for different settings are compared.

8 Claims, 3 Drawing Sheets

DIVERSITY SWITCH COMBINER

BACKGROUND OF THE INVENTION

1. Field of the Invention

This invention relates to antenna diversity receivers, particularly those suitable for use for wideband radio reception and more particularly for multi-carrier systems.

2. Description of the Prior Art

Antenna diversity receivers use multiple antennas to overcome signal quality degradation caused by multipath fading. If the antennas are arranged such that their outputs fade independently, then the signals from the antennas can be combined to produce a signal with higher quality since it is unlikely that both antennas (branches) will simultaneously be in a deep fade. This allows the receiver to be used in areas with lower signal strengths or to provide higher signal quality and reliability within the normal system coverage area.

A common form of diversity combiner is a switch combiner, in which only one complete receiver is needed. The receiver is switched between the antennas and makes a judgment as to which antenna provides the strongest signal. Numerous schemes for doing this exist, but it is believed that none of them address suitable strategies for wideband channels. In all cases, switch combining performs less well than selection combining, in which two receivers are available so that the performance of both antennas can be simultaneously monitored, but a switch is used to select the signal from only one of them at a time. Maximal ratio combining (MRC) involves using, simultaneously, a plurality of receivers each operating on a signal from a respective antenna, and using signal processing to combine the outputs of the receivers. This gives better performance than either switch combining or selection combining, but is somewhat more expensive.

In a wideband fading channel, the bandwidth of the transmitted signal is wider than the coherence bandwidth of the channel (see S. R. Saunders, "Antennas and Propagation for Wireless Communication Systems", John Wiley & Sons, ISBN 0471986097, July 1999, for precise definitions). This implies that different parts of the received signal bandwidth will be faded to different extents, so the choice of the best antenna is not clear. A switch combiner could make a decision based on the total power available over the whole signal bandwidth, by performing a vector sum of the respective channel outputs of the receiver filter. However this yields only minor diversity gain when the delay spread is large, i.e. when there are significant delayed versions of the signal arriving at the receiver due to multipath echoes The results when selection combining is used instead of switch combining are not significantly better.

Choosing a single antenna, based on whichever criteria, and using this for the reception of the whole ISDB-T bandwidth can lead to significant degradation in performance. Mostly, this will be due to the fact that somewhere within the signal bandwidth there will be a deep null, so although at some carriers within the bandwidth there may be excellent diversity gain, there is none achieved at other carriers, with the resultant diversity gain essentially an average across the bandwidth.

Given that delay spread has been shown to produce this significant performance degradation, it would be attractive to have a combining technique which avoids this problem, but without the expense of MRC systems, and preferably using only one receiver.

Accordingly, it would be desirable to provide a switch diversity combiner which preserves the low cost of having a single receiver, but has improved performance in high delay-spread environments than available from any conventional single receiver combiner.

SUMMARY OF THE INVENTION

Aspects of the present invention are set out in the accompanying claims.

According to a further aspect of the invention, a diversity switch combiner for use in systems for receiving wideband signals is arranged to split the received signal into separate channels each carrying a respective frequency band. Respective switch means are provided for each channel in order to switch the input of each channel between different antennas. A switch control determines the switch settings in accordance with the result of a comparison operation in which the signal qualities for different settings are compared.

The invention is particularly applicable to multi-carrier signals which are transmitted in the form of symbols comprising a guard period followed by a useful part of the symbol, the guard period corresponding to the end of the useful part. In this case, the quality estimation is preferably performed during a guard period, so that the antenna switching can be carried out without causing a significant deterioration of performance.

According to a still further aspect of the invention, a diversity switch combiner forms a path between the antennas and the receiver output, which path includes at least two channels each for carrying a respective frequency band of the received signal. Each channel has an independently operable switch means for selecting which of the signals from the antennas are fed through the channel. The receiver output is based on the combined output of the channels. Accordingly, enhanced performance throughout the frequency range of the received radio signal can be achieved.

The combiner is preferably located between the antennas and the receiver, and thus conveys RF signals to the receiver. Alternatively, the combiner could be located within the receiver, e.g. in the IF section, although in this case separate versions of the circuits prior to the combiner would have to be provided for the respective channels.

The approach can be extended to as many channels as desired, until the resilience against delay spread is sufficient to account for the prevailing channel conditions. Ultimately the performance can be made to approach arbitrarily closely to the performance of switching performed on every carrier independently. At this level diversity gains may be around 9 or 10 dB.

BRIEF DESCRIPTION OF THE DRAWINGS

Arrangements embodying the invention will now be described by way of example with reference to the accompanying drawings, in which.

DETAILED DESCRIPTION OF THE PREFERRED EMBODIMENTS

Figure 1:
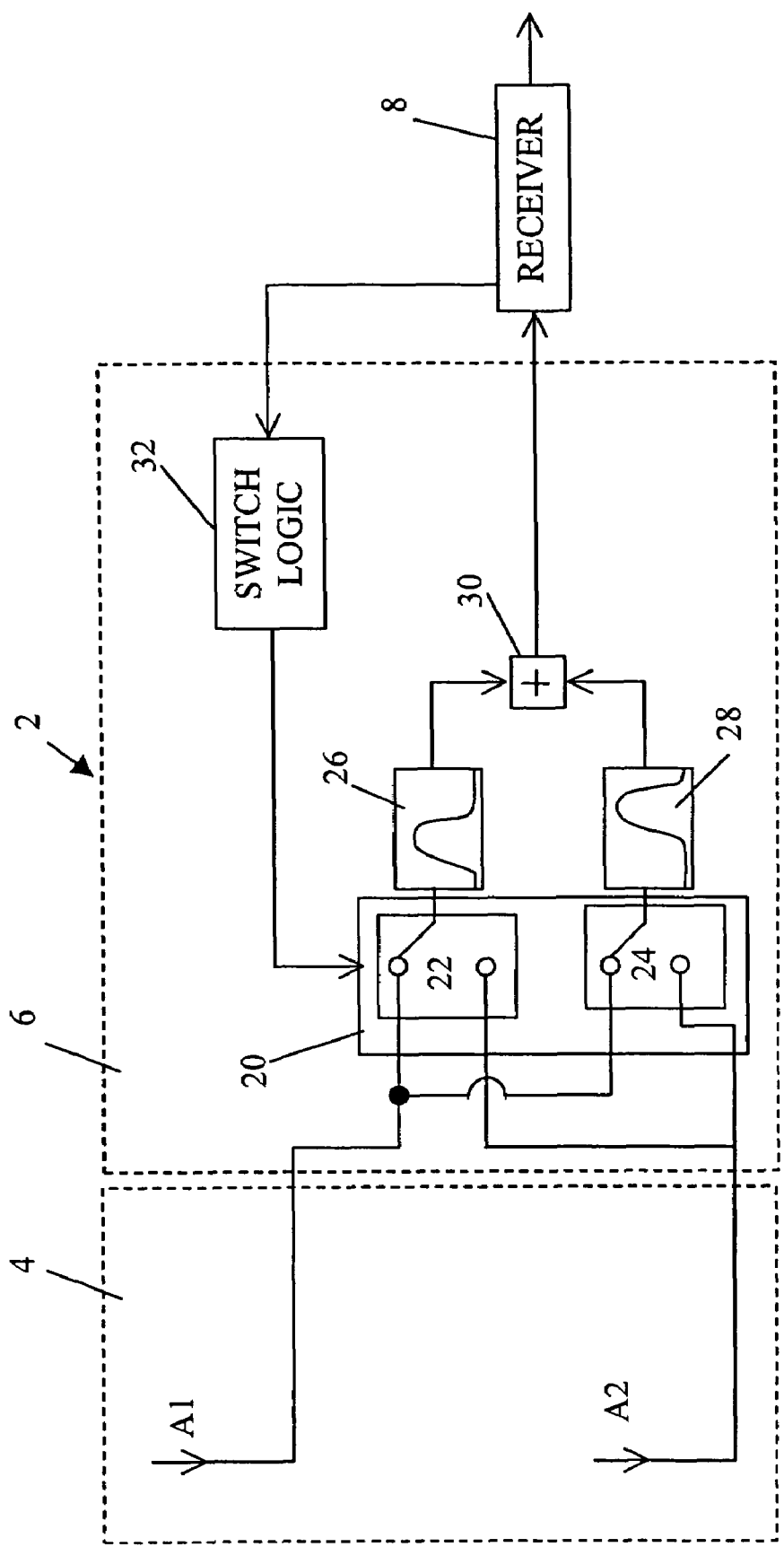
FIG. 1 schematically illustrates a receiver system according to a first embodiment of the invention.

In FIG. 1, a basic embodiment of the invention is shown. The receiver system 2, which is intended for receiving OFDM (Orthogonal Frequency Division Multiplex) signals, includes an antenna section 4, a switch combining section 6 and a receiver circuit 8 which includes means for converting the received signal to baseband.

In the antenna section 2, two antennas, A1 and A2, are arranged so that their outputs fade independently. The outputs are coupled to a switch block 20 of the switch combining section 6. The block 20 incorporates two switches 22 and 24 and is operable to couple each output to a respective one of two staggered tuned filters 26, 28. The filters are arranged to select only one respective half of the received signal band each. The outputs of the filters 26 and 28 are combined in a combiner 30, the output of which is delivered to the receiver circuit 8.

The switch combining section 6 also includes switch logic 32 responsive to signals from the receiver circuit 8 for choosing which of the antennas should be routed to each of the filters. This can be based on a comparison of the possible switch states examined during a guard period of the received signal. Thus a deep null in one antenna in one half of the segment can be avoided if it is not present in the other antenna. The system is then resilient to almost twice the delay spread as conventional full-band switching.

Figure 2:
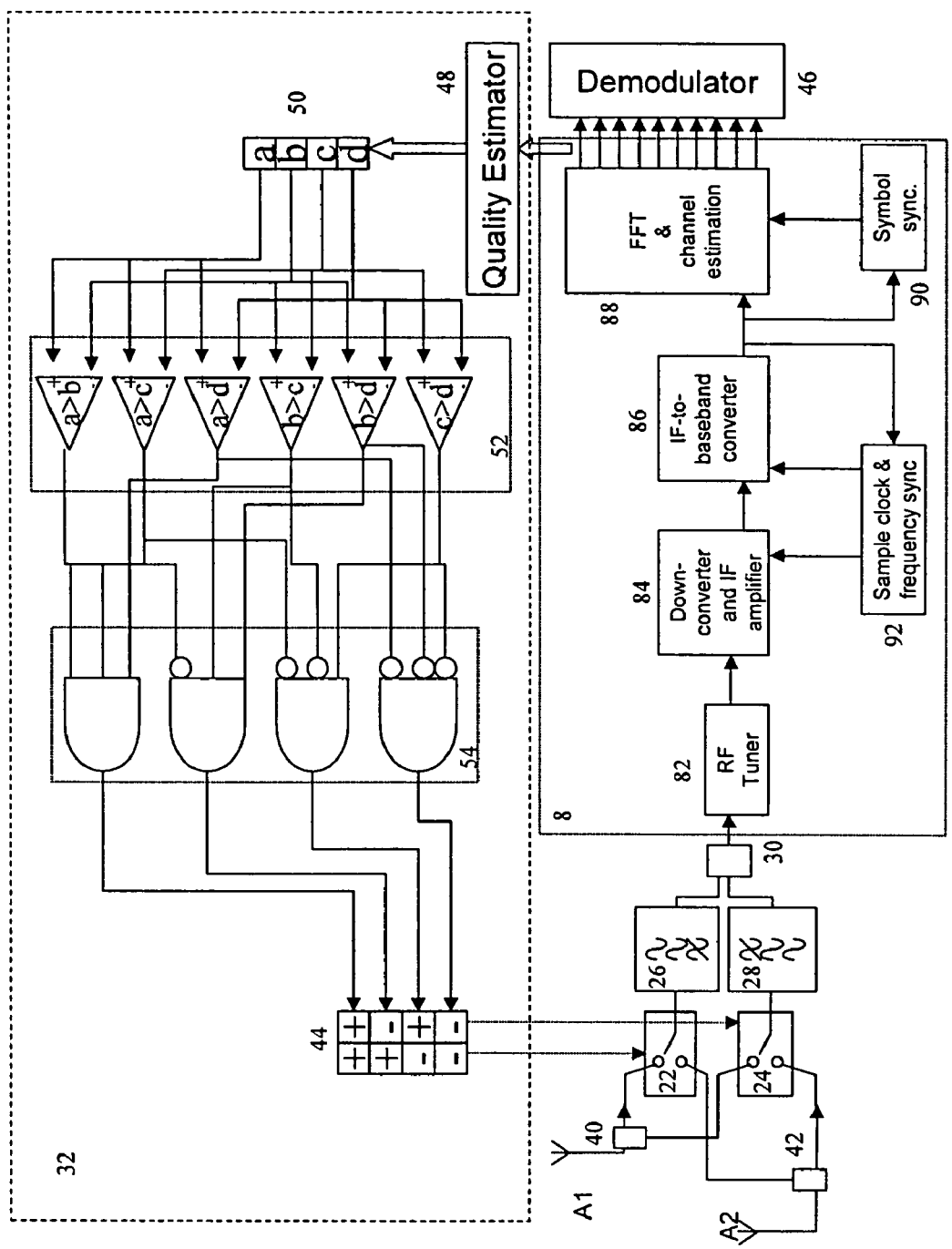
FIG. 2 is a more detailed block diagram of the receiver system of FIG. 1.

FIG. 2 illustrates the system in more detail. The two antennas, A1 and A2, are arranged so as to produce substantially independent fading signals. The signals are split via splitters 40 and 42 and sent to electronically controlled switches 22 and 24. A control unit 44 selects each of the four possible states of switches 22 and 24 sequentially during an initial phase of operation, typically during a symbol guard interval. The output signal from switch 22 is filtered by a high-pass filter 26, which outputs only the upper half of its input signal bandwidth, while switch 24 is connected to a low-pass filter 28 which outputs only the lower half of its input signal bandwidth. The two filter outputs are summed by combiner 30 and the result forms the input to a conventional receiver circuit 8. At its output, the receiver circuit produces individual carriers of the OFDM signal, which are normally demodulated by a demodulator 46.

The carrier outputs are sent to a quality estimator 48 to estimate the quality of the resulting signal, typically using soft decision information or otherwise. There are various known ways of estimating signal quality. For example, the distances of the carrier outputs from the correct positions for the carrier constellation can be measured. It is not necessary to use all the carriers for quality estimation, although the carriers which are used should be spread throughout the frequency spectrum of the signal. It is possible to base the quality estimation on pilot carriers, by comparing their actual values with the known values they should adopt in a clean, noise-free system. Alternatively, spectrum estimation based on a limited number of samples could be used.

The quality estimates for the four possible switch states are stored in a memory unit 50. A bank 52 of six comparators forms pairwise comparisons of all four quality estimates. The comparators are connected to a bank of four logical AND gates and associated NOT operations 54 which selects the largest of the four quality estimates. The result selects one of the four switch states within the control unit 44 and sets the switch states to correspond to the highest quality combination of branches. If the quality estimations can be achieved sufficiently quickly, which will depend on the process used, the switch state is preferably set during the current symbol, and more preferably before the beginning of the useful part of the symbol. The state is held for as long as appropriate (typically a symbol duration) before the whole process is repeated. If the quality estimation takes too long to be of value for the current symbol, the switch state could instead be set for the useful part of the next symbol (after first altering the state during the next guard interval for obtaining further quality estimates). It is not necessary to repeat the process regularly. Instead the process could be triggered by a detected deterioration in quality.

The receiver circuit 8 shown in FIG. 2 includes an RF tuner 82, which receives the signals from the antennas via the switches 22 and 24 and filters 26 and 28. The output of the tuner 82 is delivered to a down converter and IF amplifier 84, which supplies its output to an IF-to-baseband converter 86. The baseband signals from the converter 86 are sent to an FFT and channel estimation block 88, which generates the OFDM carrier signals for the receiver circuit output. The baseband signals are also delivered to a symbol synchronisation circuit 90, for synchronising the operation of the FFT and channel estimation block 88, and to a sample clock and frequency synchronisation circuit 92 which synchronises the operations of the down converter and IF amplifier 84 and the IF-to-baseband converter 86.

This is merely one example of a number of different types of receiver circuits which could be employed in the system of FIG. 2. In alternative arrangements, the switches 22 and 24 and filters 26 and 28 could instead be provided within the receiver circuit 8, for example between the down converter and IF amplifier 84 and the IF-to-baseband converter 86, with suitable modifications to the filter characteristics and duplication of the circuits preceding the converter 86.

Figure 3:
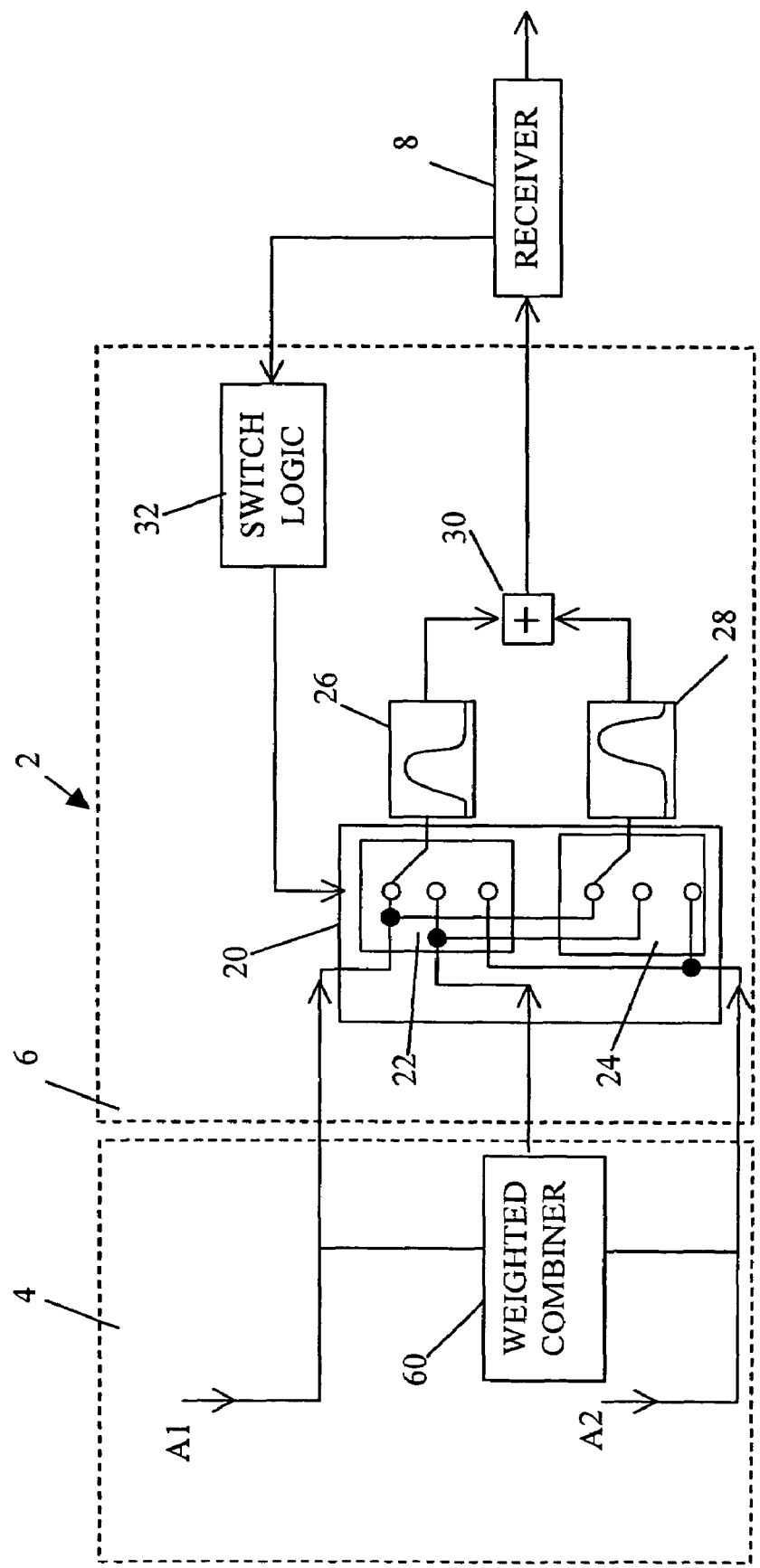
FIG. 3 schematically illustrates a receiver system of a second embodiment of the invention.

Another development of the basic approach is shown in FIG. 3. This embodiment is largely similar to that of FIG. 1, and like integers have like reference numerals. In the embodiment of FIG. 3, however, the antenna branches have been combined in a weighted combiner 60, with a fixed weighting to form another branch. This may be regarded as a fixed beam-steering network, which will have less fading in some parts of the band than either of the antennas alone. Again this can be extended to multiple combining networks and multiple sub-band filters. In the limit of having enough combining networks and sub-band filters, this approach will be capable of the same performance as maximal ratio diversity combining performed on every carrier. This approach will thus only produce a small extra performance gain over the previous case.

In all cases two basic front ends (each comprising a splitter, a switch and a filter) are required in order to have simultaneous access to signals from both antennas. This may not necessarily be more economical than performing MRC at the receiver IF, but the choice will depend on the relative costs of the various RF components.

It is envisaged that the receiver circuit which is used to generate the main receiver output is also used for obtaining the measurements for the quality estimates, but this is not essential.

The diversity system proposed is applicable to any wideband radio system, using any number of antennas. It is particularly relevant to applications at user terminals where power consumption, size and cost are particularly critical, whereas base stations will usually implement diversity combiners which use one receiver circuit per branch.

Particular systems which are applicable are:
ISDB-T
DAB
DVB
UMTS
cdma2000

The invention claimed is:
1. A diversity switch combiner for a receiver system for receiving signals in the form of successive symbols including guard periods, the diversity switch combiner comprising a plurality of antennas and a receiver circuit for converting signals from the antennas into baseband signals provided at a baseband output, the diversity switch combiner comprising:
- at least two signal channels between the antennas and the baseband output, each channel being arranged to carry a respective different frequency band of the received signal,
- switch means for selectively coupling the antennas to each signal channel, and
- switch control means which is operable to determine the quality of the signals carried by the signal channels for different settings of the respective switch means, and to control the setting of the switch means in dependence upon the quality determination,
- wherein the switch control means is arranged to alter the switch settings during a guard period in order to determine the quality of the transmitted signals in each respective frequency band, and is thereafter operable to control the setting in accordance with the determined quality.

2. A combiner as claimed in claim 1, wherein each signal channel includes a filter for restricting the frequency band transmitted by the channel.

3. A combiner as claimed in claim 1, wherein the switch control means is operable to determine the signal qualities during each guard period so as to control the switch setting for the current symbol.

4. A combiner as claimed in claim 1, wherein each signal channel is arranged to carry RF signals.

5. A combiner as claimed in claim 1, wherein each signal channel is arranged to carry IF signals.

6. A receiver system comprising a plurality of antennas, a receiver circuit for converting signals received from the antennas into baseband signals, and a diversity switch combiner as claimed in claim 1.

7. A receiver system as claimed in claim 6, including a combining means for combining signals from a plurality of antennas, the switch means being arranged selectively to couple to each respective signal channel the outputs of the antennas and the combining means.

8. A method of operating a wideband receiver having at least two antennas, the method comprising:
- receiving signals in the form of successive symbols including guard periods;
- separating the received signal into different frequency bands;
- for each frequency band, during guard periods determining the quality of the signals received from the respective antennas;
- for each frequency band, independently selecting the antenna which provides the highest quality signal; and
- combining the separated signals as received by each selected antenna and demodulating the combined signal.

* * * * *